United States Patent [19]

Welcome et al.

[11] Patent Number: 4,947,116

[45] Date of Patent: * Aug. 7, 1990

[54] INDUCTIVE SPEED SENSOR EMPLOYING PHASE SHIFT

[75] Inventors: Warren W. Welcome, Tarzana; Daniel R. Sparks, Temple City, both of Calif.

[73] Assignee: Hamilton Standard Controls, Inc., Farmington, Conn.

[*] Notice: The portion of the term of this patent subsequent to Jan. 16, 2007 has been disclaimed.

[21] Appl. No.: 240,782

[22] Filed: Sep. 2, 1988

[51] Int. Cl.[5] ............................ G01P 3/48; G01P 3/60
[52] U.S. Cl. .................................... 324/173; 324/161; 324/166
[58] Field of Search ............... 324/207, 208, 160–180, 324/207.16, 207.25; 310/168, 155

[56] References Cited

U.S. PATENT DOCUMENTS

| | | | |
|---|---|---|---|
| 3,641,535 | 2/1972 | Knopf | 324/165 X |
| 3,716,787 | 2/1973 | Hammond | 324/173 |
| 3,721,859 | 3/1973 | Blanyer | 324/123 X |
| 3,728,565 | 4/1973 | O'Callaghan | 324/173 X |
| 3,750,128 | 7/1973 | Sapir | 324/166 X |
| 3,758,858 | 9/1973 | McCue | 324/166 |
| 4,161,693 | 7/1979 | Carlson | 324/173 |
| 4,764,685 | 8/1988 | Bleckmann et al. | 324/161 X |

Primary Examiner—Reinhard J. Eisenzopf
Assistant Examiner—Warren S. Edmonds

[57] ABSTRACT

A speed detector, for use with a tone wheel having metal teeth, employs two coils positioned in offset relation near the tone wheel for interacting with the tone wheel teeth and thus changing their respective inductances. The coils preferably include iron cores to enhance magnetic coupling. One coil is in a phase sense oscillator circuit and the other is an a tuned sensor network. The oscillator is coupled to, and drives, the tuned network. The change in coil inductances effects a phase shift of the resulting signals in the oscillator and the tuned network, the magnitude of that phase shift typically being double that for a comparable single coil system. The output signals of the oscillator and tuned network provide inputs to a phase condition detector which looks for a reversal in their phase sequence and uses such event to provide timing reference pulses for a final determination of speed in a known manner.

13 Claims, 4 Drawing Sheets

CLK

SIG A

FF44-4D

FF44-3D

COND. SIG A

FF44-3Q

SIG B

COND. SIG B $T_1$  $T_2$ $T_3$  $T_4$  $T_5$  $T_6$ $T_7$

TONE WHEEL ROTATION ⟶

$T_0$  $T_\theta$

INDUCTIVE SPEED SENSOR EMPLOYING PHASE SHIFT

CROSS REFERENCE TO RELATED APPLICATIONS

This application is related to U.S. Ser. No. 07/240,783 (HCI-387) and to U.S. Ser. No. 07/240,785 (HCI-384), filed on even date herewith.

TECHNICAL FIELD

The invention relates to a speed sensor and more particularly to an inductive speed detector apparatus.

BACKGROUND ART

Speed sensors, or detectors, of various types are well known. In recent years the application of speed detectors to automotive display and automotive control functions has stimulated increased demands on and sophistication of, those sensors. In one common configuration, the speed sensor is placed in non-contacting relation with a member having reference points or teeth, the relative motion therebetween is detected by the sensor and associated circuitry provides at least timing reference signals and may ultimately provide an indication of the relevant speed. Usually, the sensor is fixedly positioned and the moving member is a toothed wheel, or so called "tone wheel", which rotates at a speed which is a known function of the speed to be measured.

One often used class of speed sensors employs one or more sense coils positioned in proximity with the rotating teeth of a tone wheel for exploiting either magnetic or eddy current effects depending on whether or not magnetic materials are present in the teeth.

One sensor of the aforementioned general type is disclosed in Peter W. Hammond U.S. Pat. No. 3,716,787. In that reference, there is disclosed a speed monitoring device having a phase measurement circuit which is utilized to measure the changes in the inductance of a sensor coil as affected by the proximity of magnetically distinct pins on a tone wheel. The relative increase and decrease in spacing between tone wheel pins, or teeth, and the spaces between such teeth with respect to the sensor coil serves to vary the impedance or inductance of that coil in a tuned circuit in which it is included. Such variation in the impedance effects a circuit phase-shift with respect to a predetermined reference signal of voltage and current in the circuit to indicate movement of the wheel and a measurement of the speed of movement in a measured time interval.

Another Said Sapir U.S. Pat. No. 3,750,128 discloses a pulse generator which produces output pulses at a pulse repetition frequency directly proportional to the wheel velocity. The output pulses may be used in a conventional anti-skid braking system. The pulse generator is operative even at low velocities since it employs an oscillator-energized variable reluctance transformer.

Yet another device for sensing speed is disclosed in Gerald O'Callaghan U.S. Pat. No. 3,728,565. That reference discloses first and second spaced-apart stator windings positioned near a rotating tone wheel. Respective sinusoidal voltages are induced in each of the stator windings and the magnitude of those voltages is indicative of the speed.

With respect to the U.S. Pat. No. 3,728,565 reference, it will be appreciated that the system is dependent upon the speed of rotation of the tone wheel for an amplitude signal to provide a corresponding speed signal. Such systems are inherently limited, particularly with respect to low speeds of operation and/or variations in the signal magnitude occasioned by other than speed alone. It is also desirable that the sensor operate over a relatively wide gap between it and the tone wheel, however, amplitude-dependent systems exhibit characteristic weaknesses in that regard. Though the U.S. Pat. Nos. 3,716,787 and 3,750,128 references are not dependent upon some minimum speed of the tone wheel for operability since they rely upon phase-shift techniques, they do possess other limitations. For instance, with respect to U.S. Pat. No. 3,716,787, the phase shift in the circuit containing the sensing coil is determined relative to a fixed reference signal from the oscillator which drives the sensing coil circuit. Since the reference signal has a fixed frequency, the circuit containing the sensing coil is capable of only a limited relative phase shift. Such limitation generally requires a relatively strong interaction between the tone wheel and the coil and circuitry to provide a desired response. In U.S. Pat. No. 3,750,128 a transformer interacts with the tone wheel and with a rectangular wave generator to create the requisite phase shifts.

Accordingly, it is a principal object of the invention to provide an improved speed detector apparatus which is operative at all speeds.

It is a further object of the present invention to provide an improved speed detector apparatus which is operative over a relatively wide operating gap between the sensor and the tone wheel, particularly with a substantially constant signal amplitude. Included within this object is the provision of such apparatus for use with a tone wheel having metal teeth of either a magnetic or a non-magnetic material.

It is a still further object of the invention to provide an improved speed detector apparatus in which the associated circuitry is of a digital character.

It is a yet further object of the invention to provide an improved speed detector apparatus which is accurate, relatively compact and susceptible of economical manufacture.

DISCLOSURE OF THE INVENTION

According to the invention there is provided an improved speed detector apparatus for use in combination with a tone wheel having multiple metal teeth. The apparatus includes an oscillator, a tuned circuit interconnected with the oscillator and phase shift condition detection means coupled to the oscillator and the tuned circuit. The oscillator comprises a first inductive sensing coil adapted to be positioned adjacent to passing teeth on the tone wheel to thereby change its inductance, the frequency of the oscillator being determined at least partly by the inductance of the first coil. The tuned circuit interconnected with the oscillator comprises a second inductive sensing coil, that tuned circuit being driven by the oscillator and the second inductive sensing coil being adapted to be positioned adjacent to passing teeth on the tone wheel. The first and second inductive sensing coils are offset from one another relative to the passing teeth on the tone wheel such that their respective changes of inductance are relatively out of phase. The output signals of the oscillator and the tuned circuit cyclically shift phase as the tone wheel is displaced. A phase shift condition detector detects the phase shift relation between the oscillator and the tuned circuit and, as a function thereof, provides timing pulses recurring at a frequency representative of the speed of the tone wheel.

The first and second inductive sensing coils each have, under the same conditions, the same inductance, and each preferably includes a ferromagnetic core. The cores may be of "C" shape and spaced from the tone wheel by an operating gap of 0.050 to 0.10 inch. In one embodiment, each core is oriented with its opposite ends angularly spaced from one another in the direction of tone wheel rotation, and in another embodiment, its opposite ends are spaced from one another in a direction substantially perpendicular to the direction of displacement of the tone wheel.

The oscillator and the tuned circuit are structured such that the phase of the second output signal relative to the first output signal reverses during the cyclical phase shifting. Accordingly, the phase shift condition detector detects when a said phase reversal occurs to provide the desired timing pulses. The oscillator and the tuned circuit each include reactive phase-shifting elements which provide sinusoidal signals. Those signals are in turn digitized, as by active amplifiers in those respective circuits, to provide the respective output signals therefrom in digital form. The phase shift condition detector employs digital logic to identify the phase reversal event.

Other features and advantages will be apparent from the specification and claims and from the accompanying drawings which illustrate an embodiment of the invention.

BEST MODE FOR CARRYING OUT THE INVENTION

Figure 1:
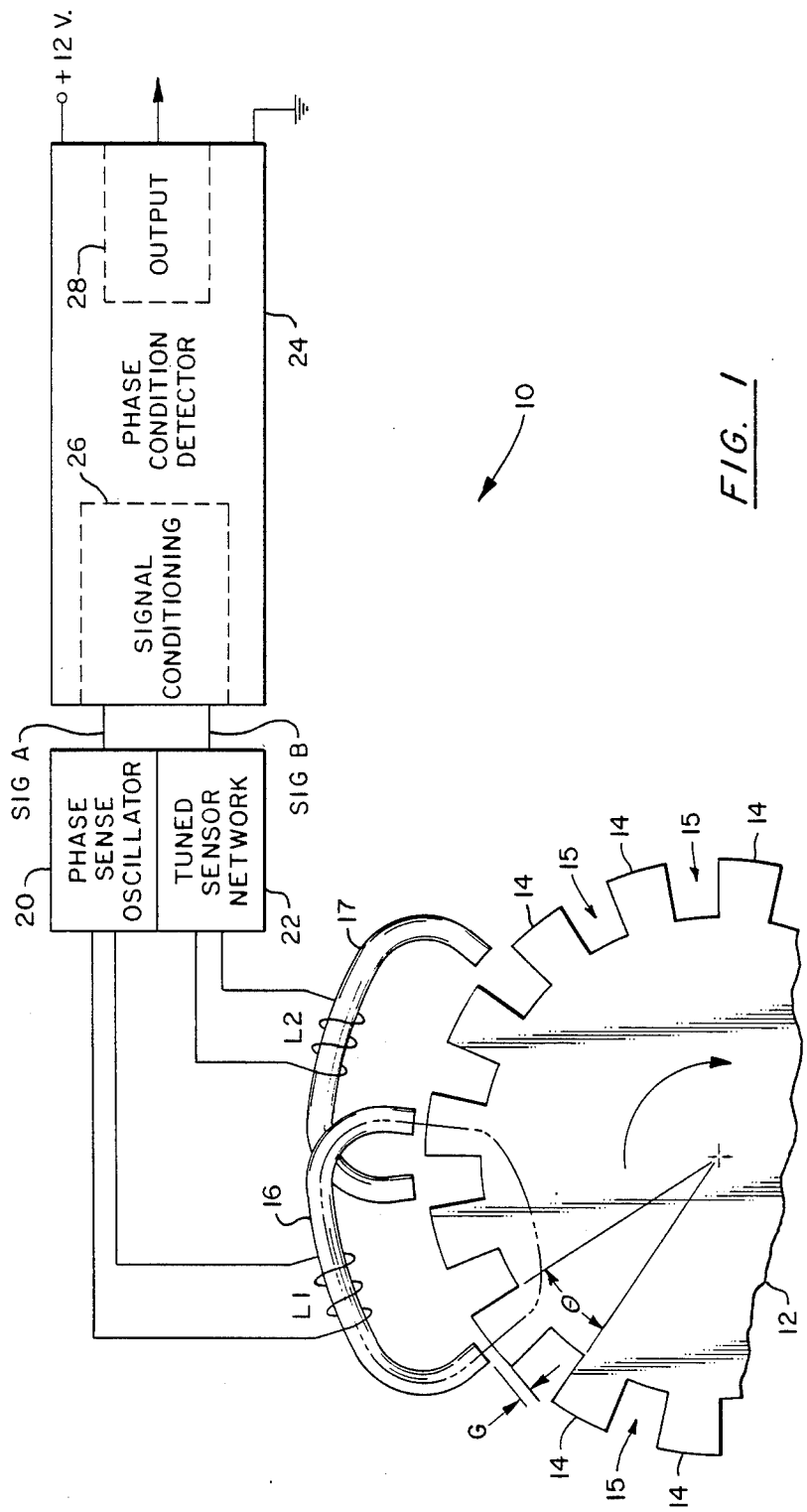
FIG. 1 depicts, partly in block diagrammatic form, the speed detector of the invention operatively disposed adjacent a tone wheel.

Referring to FIG. 1 there is depicted in diagrammatic form, a speed detector 10 operatively positioned adjacent a tone wheel 12. The tone wheel 12, and more particularly the pins or teeth 14 thereof, are formed of a metal which will interact with the speed detector 10. Typically, though not necessarily, the entire wheel 12 will be formed of the same material as the teeth 14. In the present instance, the wheel 12 and teeth 14 are formed of a ferromagnetic material, such as steel, for magnetic interaction with the speed detector 10. However, the teeth 14 in wheel 12 might alternatively be formed of a nonmagnetic, metallic material, as for instance aluminum, which will similarly work with the speed detector 10 of the invention, but instead employing eddy current principles which invert the effect. The tone wheel 12 rotates in the direction indicated by the arrow. Its speed of rotation is typically correlated with the speed of some other member, the speed of which is ultimately to be determined. Tone wheel 12 may typically be associated with some other rotating part, as for instance a wheel or some associated rotating portion of the drive train of an automobile, as for use in anti-skid brake control devices.

The typical tone wheel 12 is provided with a relatively large number of teeth 14 separated by respective intermediate spaces or slots 15. The pitch $\theta$ between the same point on successive teeth 14 is uniform about tone wheel 12. Assuming tone wheel 12 has 72 teeth, $\theta$ will have a value of 5°. The angular extent of the slot 15 may be comparable to that of a respective tooth 14, but need not be, in order for the speed detector 10 to be operative.

Referring to the diagram of speed detector 10 in FIG. 1, a pair of iron-cored coils L1 and L2 provide the physical sensing components which directly interact with the tone wheel 12. The iron cores 16 and 17 respectively associated with coils L1 and L2 are made of magnetic material and, may preferably have a "C" shape. In one instance, the cores 16, 17 were formed of alloys of iron, nickel, and other materials utilized in the form of a thin tape wound on a nonmagnetic bobbin to form a toroid, which was then cut through its diameter to provide the requisite "C" shape. The coils L1 and L2 were then respectively wound on the respective cores 16 and 17. The inclusion of cores 16, 17 serves to confine and transport the flux associated with the coils L1 and L2 and thus allows some control of the magnetic flux near a respective tooth 14. It will be appreciated that the configuration of the cores 16, 17 may be modified substantially without departing from the principles of the invention.

In accordance with the invention, it is important that the sensing coils L1 and L2 be offset from one another relative to the passing teeth 14 on tone wheel 12 such that the change affecting or induced in each coil is relatively offset or out of phase with that of the other. For instance, in FIG. 1 each core 16, 17 is oriented with one end face of the core being angularly downstream of the other end of that same core with respect to the direction of rotation of tone wheel 12. Further, the angular span of each core 16, 17 is depicted as being an integral multiple of the pitch interval $\theta$, in this instance two teeth or $2\theta$. Still further and of particular importance, core 16 is angularly offset with respect to core 17 such that the inductive changes occasioned in their respective coils L1 and L2 are typically out of phase or offset. For instance, it will be noted that core 16 associated with coil L1 is shown having its opposite ends disposed over the end faces of a pair of teeth 14, whereas the opposite end faces of core 17 are at that same instant disposed over slots 15. When a current flows in the windings, L1 and L2, a flux path is established through the respective core 16, 17 and across the air gap and into the tone wheel 12. This flux path is known as the magnetic circuit. The magnetic circuit is tightly coupled when the opposite ends of a core are aligned with the end face of a tooth 14, as depicted for core 16 in FIG. 1 and further demonstrated by the dotted flux path. Similarly, the flux path is weak when the ends of the core are adjacent a space 15, as depicted for core 17 in FIG. 1.

It is desirable that the speed detector 10 be capable of reliable and accurate operation for relatively large air gap distances, "G", between the end face of a tooth 14 and the end face of a core 16, 17. Moreover, it is desirable that detector 10 be as insensitive as possible to changes in the air gap "G" as might be occasioned thermally or by the introduction of dirt and/or corrosion. In the present instance, the detector 10 is capable of reliable operation for a gap spacing of 0.1 inch and in some instances, greater.

Figure 2:
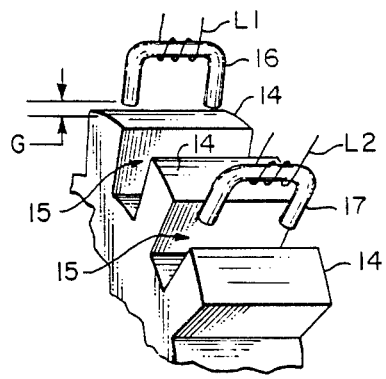
FIG. 2 depicts an alternate embodiment of the inductive coils forming part of the speed detector of the invention.

Referring to FIG. 2, there is depicted an alternate, and perhaps preferred, orientation of the cores 16, 17. More specifically, it will be noted that each core 16, 17 has been rotated approximately 90° from the orientation depicted in FIG. 1. Such orientation may permit a more compact packaging of the sensors and may further contribute to increased magnetic coupling when the core is over a tooth 14 and decreased coupling when it is over a slot 15. Utilization of a configuration such as depicted in FIG. 2 does of course require thickness of a tooth 14 and/or compactness of a core 16, 17 to entirely accommodate that core over a respective tooth. In any event, it is still necessary to insure that cores 16 and 17 are offset from one another relative to the passing teeth 14 such that their respective changes of inductance are relatively out of phase. One such arrangement is depicted in FIG. 2 in which core 16 is shown over a tooth 14 and core 17 is shown over a slot 15.

Figure 3:
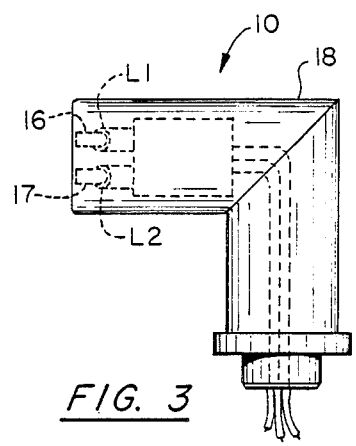
FIG. 3 depicts the speed detector of the invention within an associated house.

Briefly referring to FIG. 3, the speed detector 10 is shown conveniently housed within a suitable housing 18 which may in turn be rigidly positioned near the tone wheel 12 with its end containing the sensing coils L1 and L2 slightly spaced therefrom in operative relation.

Returning to FIG. 1 for a further consideration of the circuitry of speed detector 10, there is depicted in block diagram form, a phase sense oscillator 20, a tuned sensor network 22 and a phase condition detector 24. Additionally, a voltage regulating circuit may be associated with detector 10. The phase condition detector 24 is shown as including, within broken line, certain signal conditioning circuitry 26 and output circuitry 28. The signal conditioning circuitry 26 and output circuitry 28 may vary somewhat with respect to their functions and configuration.

Figure 4:
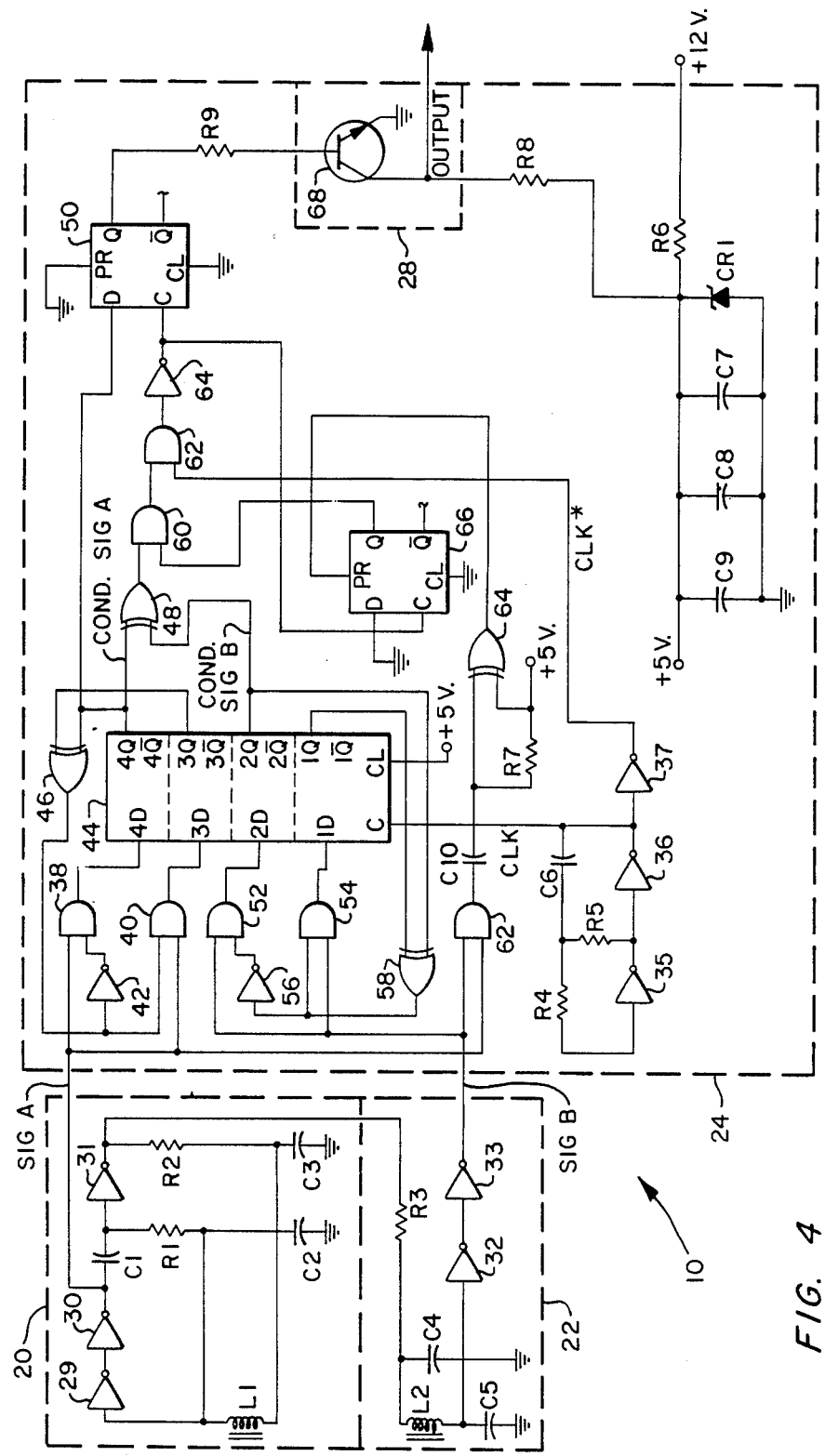
FIG. 4 is a detailed schematic diagram of the circuitry of the detector of FIG. 1 in accordance with an embodiment thereof.
Figure 6A:
FIGS. 6A–6H depict various waveforms associated with a portion of the circuitry depicted in FIG. 4.
Figure 6B:
Figure 6C:
Figure 6D:
Figure 6E:
Figure 6F:
Figure 6G:
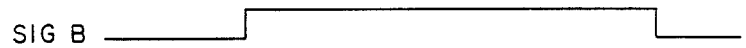
Figure 6H:

Attention is now directed to the detailed schematic diagram of FIG. 4 for a clearer understanding of the speed detector 10 of the invention. The iron-cored inductive sensing coil L1 is seen to be included as part of the phase sense oscillator 20. The inductive coil L1 is, for example, several hundred turns of enameled wire, wound on a one half of a toroidal core. The resistance of coil L1 is several ohms. Its normal inductance is approximately 1.5 millihenrys (mh). Phase sense oscillator 20 is designed to operate at a frequency which is well above the audio range but is not likely to cause radio interference. In the illustrated embodiment, the oscillator has a frequency near 30 KHz and will be seen to vary slightly about that frequency as a function of the changing inductance of L1 as the tone wheel 12 rotates.

Phase sense oscillator 20 includes a pair of inverters 29 and 30 arranged in tandem and serving as active elements for providing gain in the circuit. A further inverter 31 in series with inverter 30 effects a 180° phase shift, and the remaining 180° phase shift for the oscillator is provided by the filter network which includes inductor L1, capacitors C2 and C3, and resistor R2. A series capacitor C1 is connected between inverter 30 and inverter 31 to block the DC path, which thereby allows the inverter 31 to bias itself in the linear region through resistor R1, thus assuring that oscillations will start. Because of the amplification afforded by the inverters 29 and 30, the output of inverter 30 is a digital or pulse-type signal as square wave form and is designated SIG A. The square wave out of the inverter 31 is filtered by the network of R2, C3, L1 and C2, such that it assumes a sinusoidal form and is greatly attenuated. As mentioned, the tandem inverters 29, 30 subsequently amplify and digitize that sinusoidal waveform to provide SIG A. Circuit components C1 and R1 for starting oscillations may be considered optional.

The tuned sensor network 22 might alternatively be viewed as a low-pass filter or a phase shift network. In any event, network 22 is driven by phase sense oscillator 20 via its connection to the output of inverter 31. Network 22 includes, in addition to the inductive sensing coil L2, a filter network including resistor R3 and capacitors C4 and C5. As with the phase sense oscillator 20, the sensor network 22 also includes a pair of inverters 32 and 33 arranged in tandem for amplifying and squaring the sinusoidal signal developed prior thereto in that circuit. The output of inverter 33, and thus of sensor circuit 22 is a digital or pulse-type signal of square waveform and is designated SIG B.

According to the invention it is highly desirable that the filter elements of the sensing network 22 have component values which are substantially identical to their counterparts in the phase sense oscillator 20. For instance, R2 should equal R3 and the values of C2 and C3 should equal one another and should correspondingly equal the values of C4 and C5. Similarly, the natural inductances of L1 and L2 should be substantially identical in a given identical ambient condition such as in open air. In one embodiment, resistors R2 and R3 had values of about 10K ohm, capacitors C2, C3, C4 and C5 had values of 0.033 uf and each of the inductors L1 and L2 had values of about 1.16 millihenry. Thus, SIG B will be like SIG A in appearance but will usually be phase-shifted therewith as will be better understood hereinafter.

As a tooth 14 passes beneath a particular coil L1 or L2, the inductance of that coil changes and more specifically, increases. Conversely, as the coil moves away from a tooth and over a slot 15, its inductance decreases. If, instead, eddy current principles were involved, the effect would be reversed. Ideally, both coils L1 and L2 will be in resonance at mid-transition, that is, when both coils L1 and L2 and their associated cores 16 and 17 are subjected to the identical conditions caused by the positioning of the teeth 14 and the slots 15. The oscillator coil L1 will always work in resonance because the frequency of that circuit will shift as required to maintain 180° phase throughout that network. Thus, as a tooth approaches L1 and its inductance increases, one would expect to see the frequency of the oscillator 20 decrease somewhat. On the other hand, the sensor network 22 is operating off resonance most of the time except for those instances in which the physical conditions presented to the two coils are identical.

The difference in operating frequencies between the circuits of oscillator 20 and network 22 manifest themselves as a phase shift between the resulting output signals SIG A and SIG B. Moreover, since the frequency of oscillator 20 is not constant but may vary as a function of the inductance of L1, the resulting shift in phase between the output signals SIG A and SIG B is doubled. Stated another way, if oscillator 20 and network 22 are operating at a common resonant point because both coils L1 and L2 are experiencing the same conditions with the tone wheel, then as the inductance of L1 changes to change the frequency of oscillator 20, the inductance of coil L2 will change in the opposite direction by a corresponding amount to double the magnitude of the phase shift. The use of a pair of inductive coils L1 and L2 connected in the respective circuits 20 and 22, each having components of similar value, also results in an inherent temperature compensation.

Figure 5A:
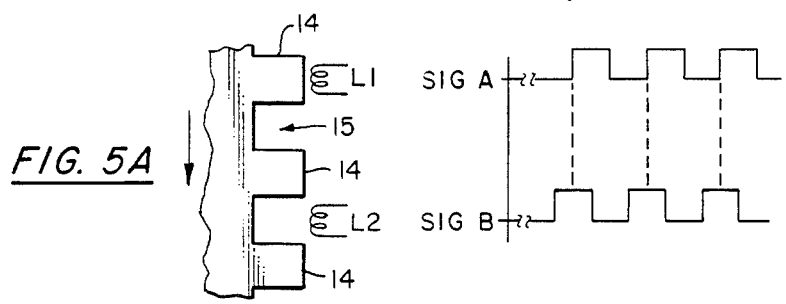
FIGS. 5A, 5B and 5C depict the relative phase shift between the signals associated with the two inductive coils as a function of the positioning of the tone wheel during its displacement.
Figure 5B:
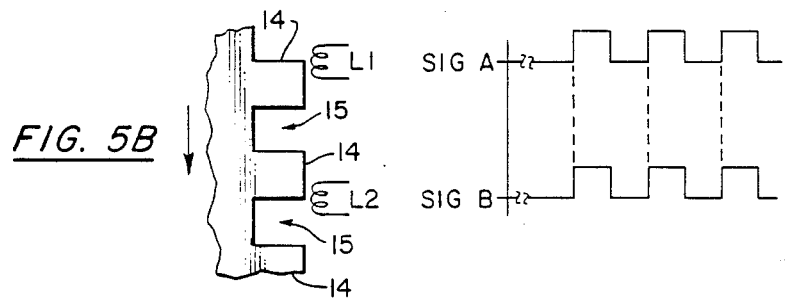
Figure 5C:
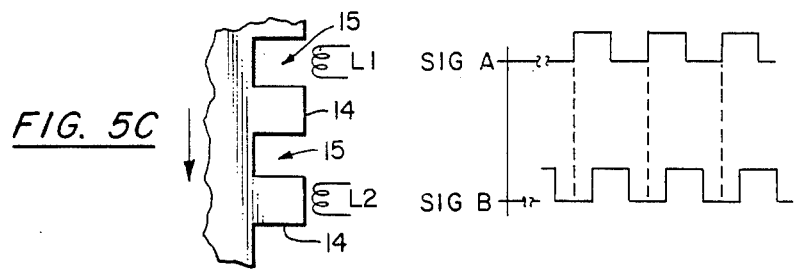

Attention is drawn to waveforms SIG A and SIG B as depicted in FIGS. 5A, 5B, and 5C and respectively depicting different conditions of magnetic coupling between coils L1 and L2 and the tone wheel 12. In FIG. 5A, the tone wheel is depicted as being at a position in which a tooth 14 is directly aligned with coil L1 and a slot 15 is directly aligned with coil L2. In that position, and at the 30 KHz rate of the phase sense oscillator 20 the output SIG A of that oscillator will be represented by the square wave appearing in the upper waveform or trace. Similarly, the output SIG B of tuned network 22 appears on the lower trace. However, it will be noted that since the coil L2 is aligned with a slot 15 and thus is a relatively lower inductance than L1 which is aligned with a tooth 14, SIG B will be phase shifted from SIG A such that it leads SIG A by some amount. Since both SIG A and SIG B were derived from sinusoidal waves, that phase shift will continue to be expressed in terms of degrees although it may also be correct to express it in terms of time or a percentage of the period between successive wave fronts.

In FIG. 5B, it will be noted that both coils L1 and L2 appear to be at the so called mid-transition point at which each is subjected to identical properties from the teeth 14 in slots 15 of the tone wheel and thus the output signals SIG A and SIG B are in phase, or coincide, with one another. It should be understood that this condition of coincidence is typically encountered twice as the tone wheel 12 is displaced through an angle θ equivalent to the pitch between successive teeth 14.

Finally, as depicted in FIG. 5C, when a slot 15 is moved into alignment with coil L1 and a tooth 14 is moved into alignment with coil L2, the conditions of FIG. 5A are reversed and now SIG A is seen to lead SIG B by a corresponding amount as a result of the phase shift in the opposite direction. The sequence from 5A–5C depicts the tone wheel 12 having been displaced an angle of ½ θ. However, the phase condition detector 24 of the speed detector 10 is structured to recognize the condition of coincidence or near coincidence, depicted in FIG. 5B, as representing some constant reference position with respect to the angle of tone wheel 12 and is thus capable of accurately generating reference signals for use by appropriate timing circuitry.

Returning to FIG. 4, further consideration is given to the phase condition detecting circuitry 24. Given SIG A from phase sense oscillator 20 and SIG B from the tuned sensor network 22, the phase condition detector 24 need only detect which of those signals leads the other and provide some form of output indication at, or near, the instant they reverse that lead. The determination of which signal leads the other represents a binary condition and is thus relatively easy to detect with digital logic. Assuming that the leading phase will be detected by noting which pulse leading edge arrives first, three potentially troublesome conditions must be accommodated in order to provide reliable operation. Firstly, since the signals are noncoherent, it is possible that they may arrive at exactly the same time and the logic must know what to do in that event. Secondly, when phases are nearly equal, a small amount of vibration or backlash could give an extra output pulse. Thirdly, the logic is required to know when to start looking for the first leading edge without confusing the second leading edge of the last cycle as the first leading edge of a new cycle. In the presently described embodiment of the invention, these matters are dealt with by the signal conditioning circuitry 26 depicted in FIG. 1; however, they are susceptible of solution in other manners as for instance as described and claimed in the aforementioned application U.S. Ser. No. 07/240,783 (HCI-387) filed on even date herewith and incorporated herein by reference to the extent consistent.

To reduce the matter to a reasonably straight forward logic design problem, the SIG A and SIG B phase signals are synchronized to a 500 KHz clock. That clock is provided by the clock oscillator consisting of inverters 35 and 36 interconnected in feedback relation through a filter network comprised of capacitor C6 and resistors R4 and R5. A further inverter 37 provides the opposite phase of the clock signal. SIG A and SIG B can thus be treated as coincident if they arrive within the same clock period, in which case no action is taken. This arrangement also handles the vibration, so long as it is small compared with a clock. Since the detector can only "dance" or "stutter" between coincidence and a specific phase difference, not between opposite phase differences, that last condition is also now easier to accommodate, as will be explained hereinafter.

The clock synchronization circuitry for SIG A is comprised of a pair of AND gates 38 and 40, an inverter 42, a pair of D-type flip-flops (3 and 4) associated with the CD40175 package of four D-type flip-flops designated 44, and an OR gate, in this instance an EXCLUSIVE OR gate 46. Both AND gates 38 and 40 receive SIG A at a respective one of their two inputs. The other input to AND gate 40 is provided by the output of EXCLUSIVE OR gate 46 and the other input to AND gate 38 is provided by that signal as inverted by inverter 42. The output of AND gate 38 is connected to the 4D input of D flip-flop 44. The output of AND gate 40 is connected to the 3D input of D flip-flop 44. The 3Q and 4Q outputs of D flip-flop 44 are connected as the two inputs to the EXCLUSIVE OR gate 46. Additionally, the 4Q output of D flip-flop 44 is connected as one input of a further EXCLUSIVE OR gate and is further connected to the D input of a further D-type flip-flop 50.

Referring to FIGS. 4 and 6, the clock output CLK from the 500 KHz oscillator is extended to the clock input common to each of the four flip-flops in D-type flip-flop 44. Each time the SIG A input to the clock synchronization circuit is high and remains high during the rise of the clock signal, as seen at the left portion of trace 6B, the output at 4Q on flip-flop 44 will be one, and only one, pulse, coherent with the clock and having a duration of one clock period. Initially, both flip-flops associated with inputs 4D and 3D of flip-flop 44 are reset and the input is low. Therefore, the output of the EXCLUSIVE OR gate 46 is low, which disables AND gate 40 and enables AND gate 38. When SIG A goes high at the input to AND gate 38 (time T1 on the timing diagram), the 4D input to flip-flop 44 is high and the flip-flop is set on the next clock (time T2). The resulting high output at 4Q raises the output of EXCLUSIVE OR gate 46, thereby enabling the AND gate 40 and disabling AND gate 38. The two flip-flops having the 3D and 4D inputs of flip-flop 44 both change state on the next clock (time T4), completing the output pulse from output 4Q of flip-flop 44. The resulting high on output 3Q of the flip-flop keeps AND gate 40 enabled and AND gate 38 disabled. This state continues as long as SIG A remains in its high state. After SIG A drops to its low state (time T6), output 3Q of flip-flop 44 is reset on the next clock (time T7) and the circuit is ready for another cycle.

The clock synchronization circuit associated with SIG B is identical to that associated with SIG A and comprises a comparable pair of AND gates 52 and 54, an inverter 56, units 1 and 2 of the four-unit D-type flip-flop 44 and an EXCLUSIVE OR gate 58. Thus, the SIG B appears as an input to both AND gates 52 and 54 and the resulting output signal appears at terminal 2Q of flip-flop 44. Representative examples of the logic states and wave forms associated with the clock synchronization circuitry are depicted in FIG. 6 in which trace 6A depicts the clock CLK; trace 6B depicts the input signal SIG A; 6C depicts the signal appearing at input 4D to flip-flop 44; 6D depicts the signal appearing at input 3D of flip-flop 44; 6E depicts the "conditioned" SIG A as it appears on output 4Q of flip-flop 44 and is designated COND SIG A; 6F depicts the output 3Q of flip-flop 44; 6G depicts the other input signal, SIG B; and 6H depicts the "conditioned" output of SIG B, COND SIG B. Note that in trace 6G, SIG B is depicted as going to the logic high state at time T3, and the COND SIG B trace of FIG. 6H goes to its high state at time T4 and returns to its low state at time T5.

Both COND SIG A and COND SIG B are connected as the inputs to EXCLUSIVE OR gate 48. Further, COND SIG A has been chosen to be connected to the D input of the D flip-flop 50, though COND SIG B might have been used instead. Impulses appearing at the inputs of OR gate 48 are clock synchronized and the output of that gate prevents clock signals from reaching the output flip-flop 50 either if there are no signal pulses present, or if both occur at the same time. This conveniently takes care of the coincident signal condition. The inhibiting effect of the output of the exclusive OR gate 48 for either of those two aforementioned conditions exists because it is applied to the enabling input of an AND gate 60, the output of which is connected to the enabling input of a further AND gate 62 to which the inverted phase of the clock, CLK*, is connected. The output of AND gate 62 is extended through inverter 64 to the clock input C of flip-flop 50.

It will be assumed that the timing for each cycle of the phase sense oscillator 20 starts with both SIG A and SIG B being in their high state. These signals are connected as the two inputs to an AND gate 62, and thus result in the output of that AND gate being a high level at that time. The first activity occurs when this point goes low as either SIG A or SIG B drops. The negative transition, differentiated by capacitor C10 and inverted by the EXCLUSIVE OR gate connected to provide the inverting function, sets D type flip-flop 66 so as to enable AND gate 60, such that the first synchronized signal pulse, either COND SIG A or COND SIG B, can get through. When a single such signal pulse occurs with flip-flop 66 set, the clock is applied to both flip-flops 50 and 66. If the first pulse is COND SIG A (derived from SIG A because it was leading), flip-flop 50 will be set. If, however, COND SIG B is the first pulse since SIG B was leading, flip-flop 50 will be reset. In either case, flip-flop 66 is reset at the end of the first pulse (COND SIG A or COND SIG B) so that the second pulse (COND SIG B or COND SIG A) has no effect. Of course, if SIG A and SIG B are coincident (within one clock period), flip-flop 66 will remain set while awaiting the single first signal pulse.

Figure 7A:
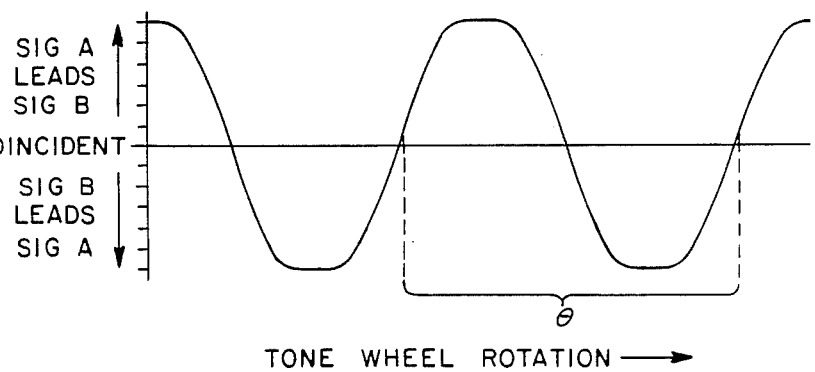
FIGS. 7A and 7B are, respectively, a plot and a waveform depicting the manner in which a phase shift condition is utilized to provide an output signal suitable for making speed measurements by conventional circuitry.

Referring to FIG. 7A, there is depicted a representative plot of the magnitude of phase shift of SIG A relative to SIG B as a function of the rotation of the tone wheel 12. The horizontal base line (X axis) represents coincidence or zero phase shift between SIG A and SIG B. Values above that axis are representative of the magnitude by which SIG A leads SIG B and values below that axis are representative of the magnitude by which SIG B leads SIG A. The units may be representative of some number of degrees of phase shift. The plot of FIG. 7A is cyclical, though not necessarily sinusoidal. Its shape will be determined somewhat by the relative shapes, dimensions and sizes of the cores 16 and 17 and the teeth 14 and the slots 15. It will be noted that one full cycle of the waveform in FIG. 7A is representative of rotation of tone wheel 12 through $\theta$ degrees, the pitch between successive teeth. It will also be noted that the phase relation reverses twice in each cycle $\theta$.

Figure 7B:
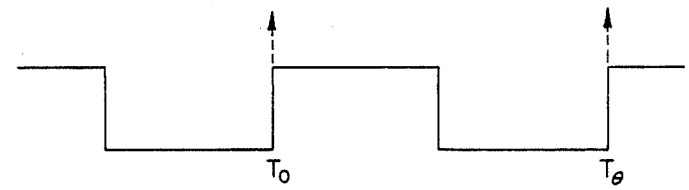

Referring to FIG. 7B, the Q output of the final D flip-flop 50 is depicted in relation to the phase shift plot of FIG. 7A. More specifically, at time $T_O$ SIG A leads SIG B by more than one clock period for the first time. Accordingly, the Q output of flip-flop 50 transitioned to the high state, where it remains until the next time a clock signal at the C input of flip-flop 50 sees a low state at the D input to that flip-flop. That condition would have occurred immediately after any coincidence of SIG A and SIG B and upon the first time thereafter that COND SIG B leads COND SIG A. The Q output of the flip-flop 50 will again transition to the high state at $T_\theta$ immediately following the next transition through coincidence from the condition of SIG B leading SIG A to the condition in which SIG A leads SIG B. Thus, the high-going transitions at $T_O$ and $T_\theta$ may be recognized as timing reference events which correlate directly with fixed positions on the tone wheel 12 at angularly spaced intervals of $\theta$ degrees. Using these reference event signals in conjunction with well-known speed timing circuitry (not shown), it is then possible to display or refine the speed in the manner desired It will be appreciated that these reference event signals are digital and their amplitude is essentially unaffected by variations in the gap, G, as long as it operates within its relatively large operating range.

A further, optional, output buffer circuit 28 is provided by connecting the Q output of flip-flop 50 through a resistor R9 to the base of transistor 68. The emitter of transistor 68 is connected to ground and its collector is connected through resistor R8 to the 5 volt DC supply. The output signal may be taken at the collector of transistor 68, albeit in inverted form.

A voltage supply for the circuitry of speed detector 10 is depicted within the broken lines of FIG. 4 and comprises the 12 volt input supply scaled and regulated to a five volt supply potential via the series resistor R6, the shunt 5 volt zener diode CR1 and the several shunt capacitors C7, C8 and C9. Since the logic depicted in and described with references to FIG. 4 is of the CMOS type and is capable of operating on 12 volts, the inclusion of the 5 volt zener diode CR1 is not absolutely necessary. On the other hand, since vehicular electric systems are notoriously noisy, the zener does serve to provide good filtering.

It should be understood that the invention is not limited to the particular embodiments shown and described herein, but that various changes and modifications may be made without departing from the spirit and scope of this novel concept as defined by the following claims.

We claim:

1. A speed detector apparatus for use in combination with a tone wheel having multiple metal teeth, the detector apparatus and tone wheel being adapted for relative displacement, comprising:
   an oscillator including a first inductive sensing coil adapted to be positioned adjacent to passing teeth on said tone wheel to thereby change inductance, the oscillator having a first output signal having a frequency determined at least partly by the inductance of said first coil;
   a tuned circuit interconnected with said oscillator and including a second inductive sensing coil, said tuned circuit being driven by said oscillator to provide a second output signal and said second inductive sensing coil being adapted to be positioned adjacent to passing teeth on said tone wheel to thereby change inductance;
   said first and said second inductive sensing coils being offset from one another relative to the passing teeth on the tone wheel such that their respective said changes of inductance are relatively out of phase;
   the phase of said second output signal relative to said first output signal shifting cyclically as a function of the relative positioning of said teeth to the respective said first and second sensing coils during said relative displacement of said tone wheel; and
   means coupled to said oscillator and said tuned circuit for detecting a predetermined condition of the phase shift between said first and said second output signals and thereby providing timing reference signals recurring at intervals representative of the relative speed of the tone wheel.

2. The speed detector apparatus of claim 1 wherein said first and said second inductive sensing coils each have, under the same conditions the same inductance.

3. The speed detector apparatus of claim 1 wherein each of said first and said second inductive sensing coils includes a respective ferromagnetic core.

4. The speed detector apparatus of claim 3 wherein each of said cores is of a general "C" shape and is oriented such that its opposite ends are in gapped, facing relation with the teeth of the tone wheel.

5. The speed detector apparatus of claim 4 being adapted to be operative with a nominal gap between each of said cores and the passing teeth of the tone wheel of least about 0.050 inch.

6. The speed detector apparatus of claim 4 wherein each said core is adapted to be disposed with its respective opposite ends angularly spaced from one another in the direction of displacement of the tone wheel.

7. The speed detector apparatus of claim 6 wherein the opposite ends of a respective said core are spaced from each other by an integral multiple of the pitch between successive teeth on the tone wheel.

8. The speed detector apparatus of claim 4 wherein each core is adapted to be disposed with its respective opposite ends spaced from another in a direction substantially perpendicular to the direction of displacement of the tone wheel.

9. The speed detector apparatus of claim 1 wherein said oscillator and said tuned circuit are each structured such that the phase of said second output signal relative to said first output signal reverses during said cyclical shifting.

10. The speed detector apparatus of claim 9 wherein said means for detecting a predetermined condition of the phase shift between said first and said second output signals comprises circuit means for detecting a said reverse of said phase of one of said first and said second output signals relative to the other.

11. The speed detector apparatus of claim 10 wherein said first and said second output signals are in digital waveform and said circuit means for detecting a said reverse of said phase of one of said first and said second output signals relative to the other comprises digital logic means for detecting when the sequence between said first and said second output signals reverses.

12. The speed detector apparatus of claim 1 wherein said oscillator and said tuned circuit each include reactive phase-shifting elements providing a sinusoidal signal and active amplification means responsive to the sinusoidal signal for providing, respectively, said first output signal and said second output signal, each in digital waveform.

13. The speed detector apparatus of claim 1 wherein said oscillator and said tuned circuit include respective means for providing said first output signal and said second output signal in digital waveform, and wherein said timing reference signals are also in digital waveform.

* * * * *